Nov. 11, 1941.   G. J. YURCHISIN   2,262,351
MATERIAL HANDLING DEVICE
Filed May 9, 1941   4 Sheets-Sheet 1
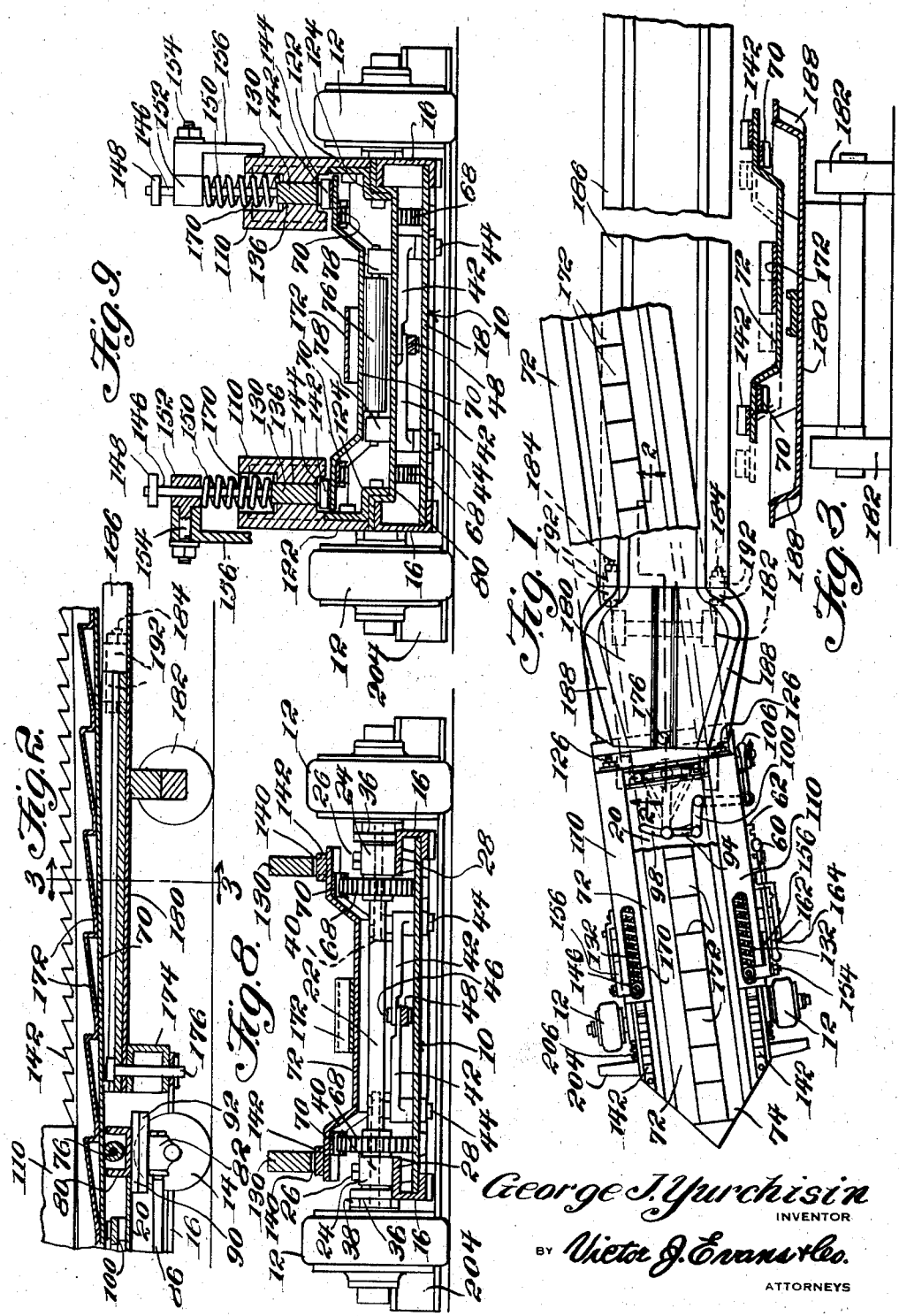

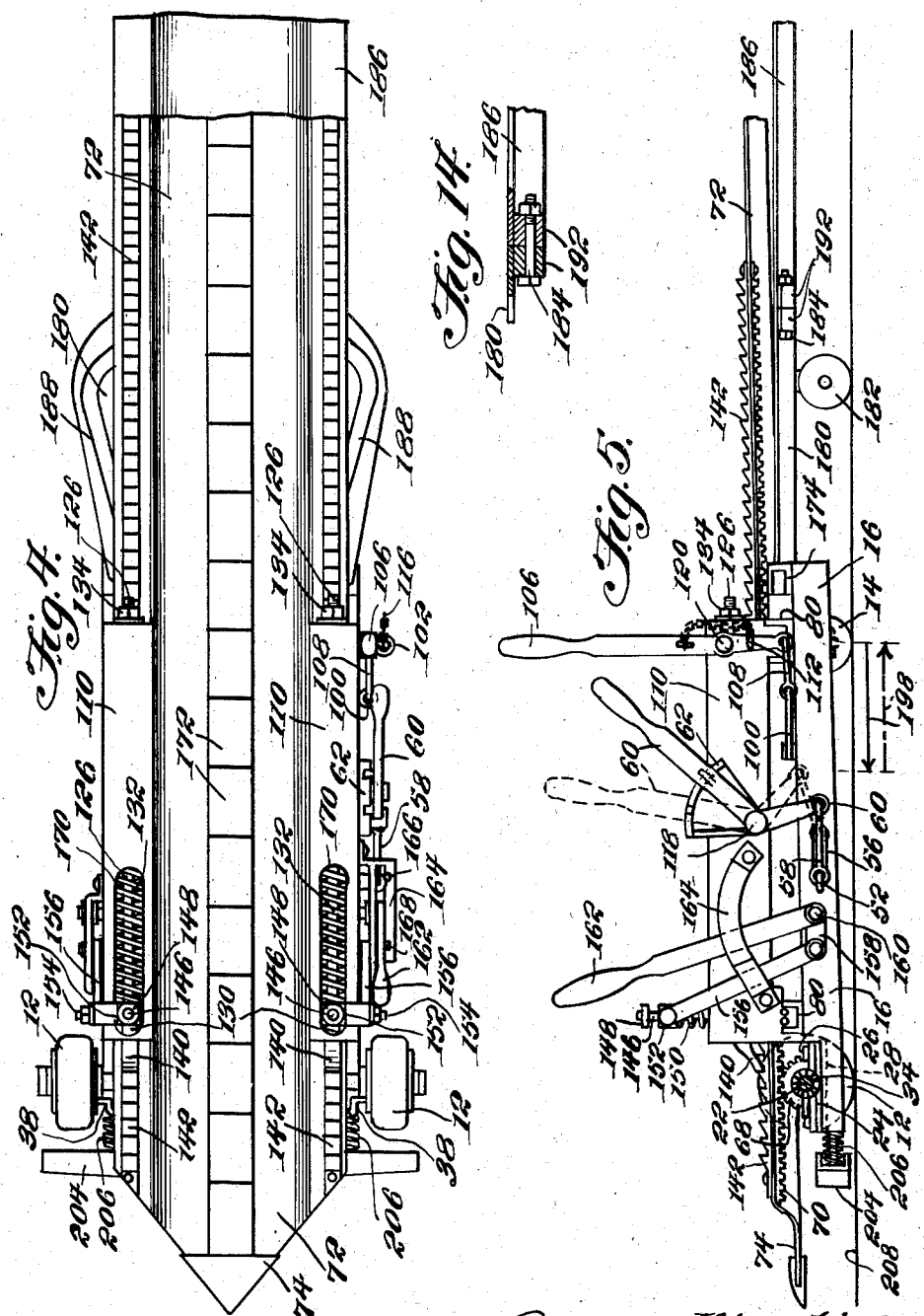

Nov. 11, 1941.    G. J. YURCHISIN    2,262,351
MATERIAL HANDLING DEVICE
Filed May 9, 1941    4 Sheets-Sheet 3
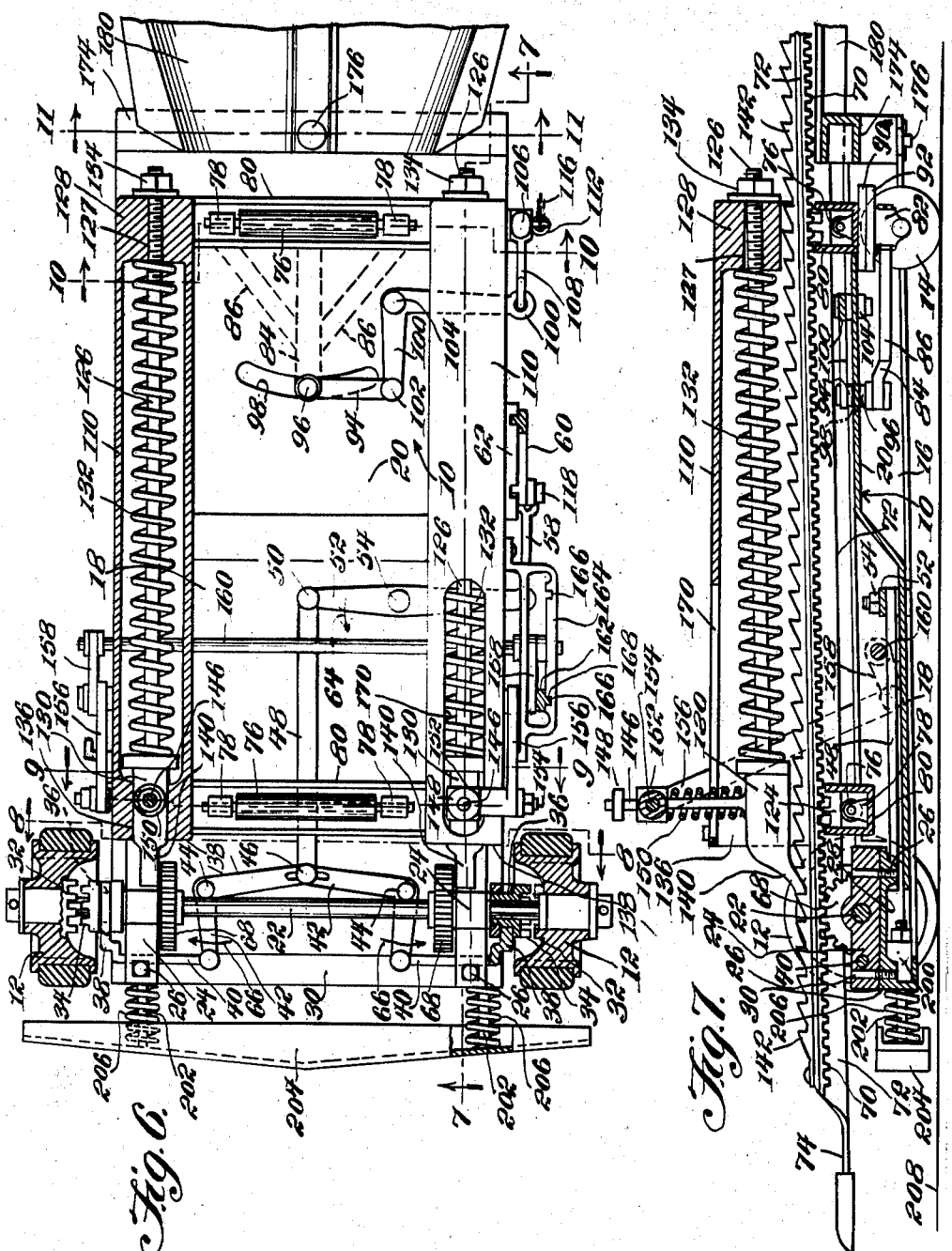
George J. Yurchisin
INVENTOR
BY Victor J. Evans & Co.
ATTORNEYS Nov. 11, 1941.  G. J. YURCHISIN  2,262,351
MATERIAL HANDLING DEVICE
Filed May 9, 1941   4 Sheets-Sheet 4
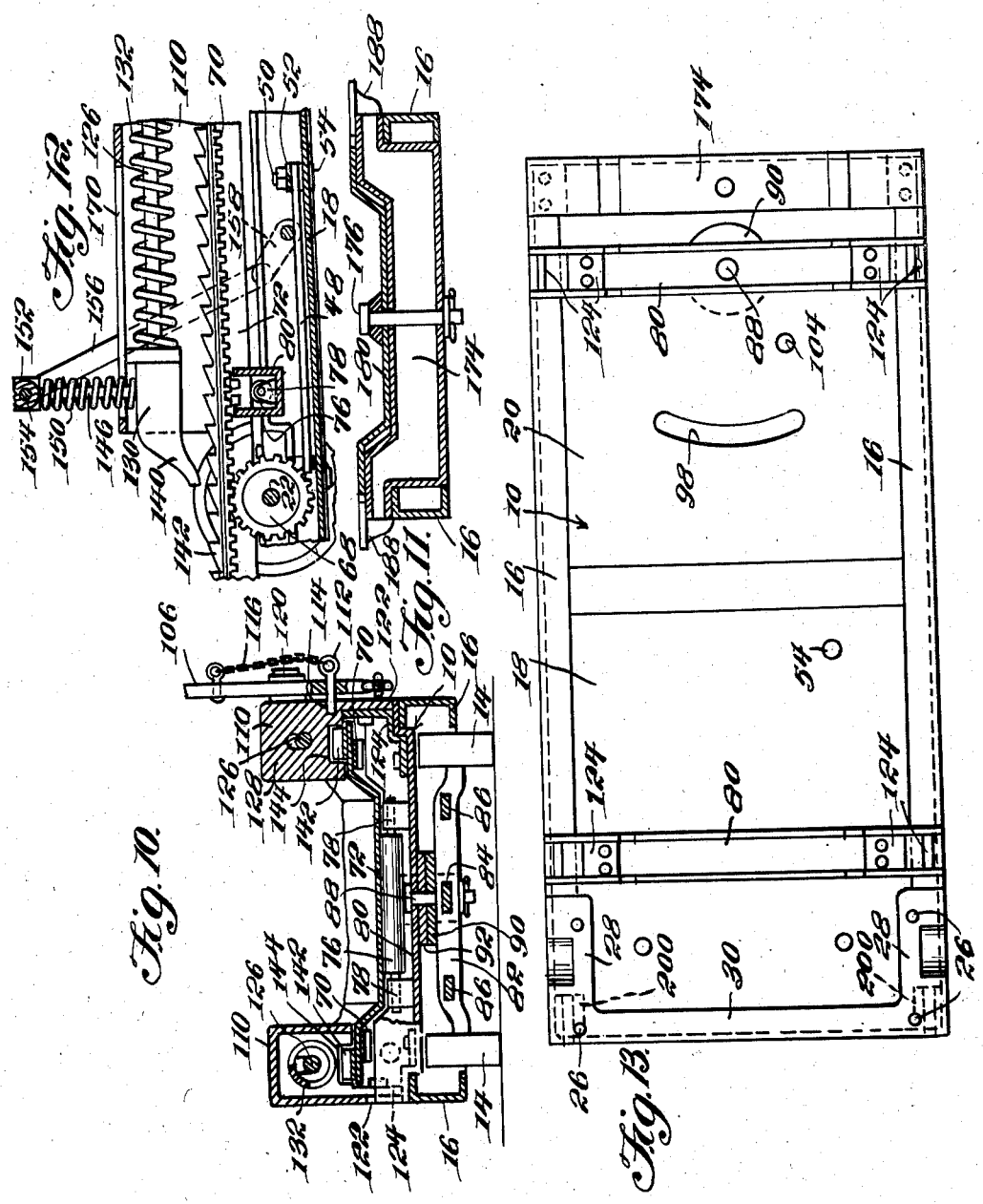

Patented Nov. 11, 1941

2,262,351

UNITED STATES PATENT OFFICE 2,262,351

MATERIAL HANDLING DEVICE

George J. Yurchisin, Wilkes-Barre, Pa.

Application May 9, 1941, Serial No. 392,770

13 Claims. (Cl. 198—220)

My invention relates to the handling and transportation of loose material such as coal, rock or the like, and has among its objects and advantages the provision of an improved feeding mechanism for shaker conveyors wherein a reciprocating gathering shovel may be projected or retracted with respect to the conveyor, and may be swung laterally, to gather loose material as from a pile on the ground.

In the accompanying drawings:

Figure 1 is a top plan view of the invention;

Figure 2 is a sectional view along the line 2—2 of Figure 1;

Figure 3 is a sectional view along the line 3—3 of Figure 2;

Figure 4 is an enlarged top plan view of a portion of the structure illustrated in Figure 1;

Figure 5 is a side elevational view of the structure of Figure 4;

Figure 6 is a sectional detail view illustrating a clutching mechanism coacting with supporting wheels of the device;

Figure 7 is a sectional view along the line 7—7 of Figure 6;

Figure 8 is a sectional view along the line 8—8 of Figure 6;

Figure 9 is a sectional view along the line 9—9 of Figure 6;

Figure 10 is a sectional view along the line 10—10 of Figure 6;

Figure 11 is a sectional view along the line 11—11 of Figure 6;

Figure 12 is a detail view of a latch device;

Figure 13 is a plan view of a supporting bed; and

Figure 14 is a sectional detail view of a connection between a truck conveyor and the main conveyor section.

In the embodiment selected to illustrate my invention, I make use of a bed 10 supported upon front wheels 12 and rear wheels 14. Reinforcing channels 16 extend along the sides of the bed, and the latter is bent transversely intermediate its ends so that its forward half 18 is dropped considerably below the rear half 20, see Fig. 7. The front wheels 12 are mounted loosely on an axle 22 extending transversely of the bed 10 and rotatably supported in bearings 24 bolted at 26 to supports 28 each welded to one of the channels 16 and a channel member 30 welded to the forward ends of the channels 16, see Figs. 6, 7 and 8.

In Fig. 6, each wheel 12 is provided with a dog clutch part 32 arranged to be respectively engaged by dog clutch parts 34 splined on the shaft 22 for relative movement longitudinally thereon but keyed for rotation therewith. Each of the clutch parts 34 is grooved at 36 for coaction with a fork 38 having a right-angular rod 40 slidable in a bore in one of the bearings 24. A bell crank 42 pivoted at 44 to the forward section 18 of the bed 10 is pivotally connected with the inner end of each of the rods 40, and the bell cranks are pivotally connected at 46 with a link 48 pivotally connected at 50 with a lever 52. The lever 52 is pivotally mounted at 54 on the section 18 of the bed 10 and extends through a slot 56 in one of the channels 16, see Fig. 5. To the outer end of the lever 52 is connected a link 58 connected with the lower end of a lever 60 which may be latched in either its full line or off position of Fig. 5 or its dotted line or on position in the same view. A quadrant 62 is provided for latching the lever in either of its two positions, and the quadrant may be provided with two notches spaced to receive the lug on the lever in either of its positions, with the lever sufficiently flexible to permit bending thereof to move the lug out of the slots.

Movement of the lever 60 to the dotted line position of Fig. 5 pivots the lever 52, see Fig. 6, in the direction of the arrow 64 which pivots the bell cranks 42 in the directions of the arrows 66 to move the clutch parts 34 into clutching engagement with the clutch parts 32, at which time the wheels 12 are keyed to the shaft 22.

To the shaft 22 is keyed two gears 68 meshing with racks 70 secured to a conveyor 72 extending longitudinally of the bed 10 and fashioned with a gathering shovel 74 at its forward end. Conveyor 72 is depressed along its central portion longitudinally thereof and rides on two rollers 76 rotatably carried in bearings 78 secured to the bights of channel-like bolsters 80, the forward one of which is welded to the top flanges of the channels 16, see Fig. 9, and the rear one similarly welded to the channels and resting on an axle 82 which carries the rear wheels 14, see Fig. 10. Both bolsters 80 are contoured to accommodate the dropped configuration of the conveyor 72.

To the axle 82 is secured a bar 84 reinforced by brace members 86, which bar may be oscillated about the axis of the king pin 88 for turning the axle 88 with wheels 14. Fig. 10 illustrates a bearing plate 90 secured to the rear bolster 80, and on the bearing plate rests a plate 92 secured to the axle 82, with the king pin 88 passing through aligned openings in the bolster, the two bearing plates and the axle.

In Fig. 6, a link 94 is pivotally connected with a pin 96 secured to the end of the bar 84 and extending through a slot 98 in the bed 10. One end of a bell crank 100 is pivotally connected at 102 with the other end of the link 94, and the bell crank is pivotally mounted at 104 on the bed 10. In Figs. 5 and 6, a lever 106 is pivotally connected with a link 108 pivotally connected with the bell crank 100, and the lever is pivotally connected intermediate its ends to a housing 110, there being one such housing at each of the two side margins of the bed 10. According to Fig. 10, the lever 106 is provided with a bore for the reception of a latch pin 112 which may be projected into a bore 114 in the housing 110 to latch the lever against pivotal movement. Removal of the latch pin permits the lever to be pivoted for turning the axle 82 and wheels 14 for steering purposes. A chain 116 connects the bolt 112 with the lever 106 to prevent unintentional misplacement of the latch bolt. It will also be noted that the quadrant 62 of Fig. 5 is secured to one of the housings 110 and that the lever 60 is pivoted at 118 to the housing, while the lever 106 is pivotally connected at 120. Figs. 9 and 10 respectively illustrate the manner in which the housings 110 are secured to the front and rear bolsters 80. To the flanges 122, depending from the housings 110, are bolted brackets 124 which are also bolted to the bights of the bolsters.

Referring to Figs. 6 and 7, each of the housings 110 encloses a rod 126 slidable in a bore 127 in the end wall 128. Each rod has a head 130 secured to its forward end, and a compression spring 132 has one end abutting the head and its other end abutting the end wall 128. The tension of the spring 132 may be varied through adjustment of a nut 134 threaded on the rod and accessible from a position exteriorly of the housing. Both housing units are identical in construction so that the description of one will apply to both.

Heads 130 are slidable in slots 136 in the front end walls 138 of the housings. Both heads terminate in latch fingers 140 which are arranged for engagement with toothed rails 142 secured to the upper faces of the two side margins of the conveyor 72, as best illustrated in Figs. 8, 9 and 10. The end walls 128 and 138 are provided with grooves 144 to accommodate the toothed rails 142 to the end that the side margins of the conveyor 72 may be positioned closely to the housings 110. The teeth of the toothed rails 142 are inclined so that the latch fingers 140 may have holding engagement with the rail members in one direction only. Thus the conveyor 72 may be adjusted to the left, as when viewing Fig. 7, without interference from the latch fingers, but the latch fingers are pressed down on the toothed rails for engagement with the teeth thereof to hold the conveyor 72 against relative movement in the other direction unless the latch fingers are lifted clear of the toothed rails.

In Fig. 9, a rod 146 is secured to each of the heads 130 and is provided with a collar 148 at its upper end. On each rod is mounted a compression spring 150 interposed between the head 130 and a collar 152 bored for loosely receiving the rod. Each of the collars 152 is provided with a shaft 154 for pivotal connection with the upper end of a link 156. Links 156 have their lower ends pivotally connected with arms 158 keyed to a shaft 160 rotatably journaled in the channels 16, and a lever 162, see Fig. 5, is fixed to one end of the shaft. A quadrant 164 is bolted to one of the housings 110 for association with the lever 162, the quadrant being provided with notches 166 to selectively receive a pin 168 on the lever for latching it in either of its two extreme positions. The lever may be flexed to bring the pin 168 clear of the notches 166. Clockwise movement of the lever 162, when viewing Fig. 5, will elevate the links 156 to move the collars 152 into engagement with the collars 148 and lift the heads 130 to move the latch fingers 140 out of engagement with the toothed rails 142. With the lever 162 in the position of Fig. 5, the link 156 holds the collars 152 against upward movement so that the springs 150 will exert pressure on the heads 130 and yieldingly hold the latch fingers 140 in engagement with the toothed rails 142.

Each of the housings 110 is provided with a slot 170 in its top wall through which the rods 146 and the springs 150 extend, see Fig. 4. These slots permit the rods and the springs to shift relatively to the housings 110, particularly to the right when viewing Fig. 7, as when the shovel 74 strikes an obstruction. Thus cushioning means are provided for the conveyor in that the springs 132 may be compressed when the shovel 74 strikes the abutment to dampen the impact.

To facilitate positive movement of the material rearwardly on the conveyor 72, the latter is provided with transverse angular formations 172 arranged on the lowest area of the conveyor. To the rear ends of the channels 16 is secured a cross beam 174 to which the forward end of a short truck conveyor section 180 is pivotally connected, as at 176. The truck conveyor is supported on wheels 182, and its rear end is bolted at 184 to the main conveyor 186, which main conveyor is given a reciprocating or jigging action by a suitable power device operatively connected thereto in the usual manner. Movement is imparted to the conveyor 72 and the loading head in accordance with the movement of the main conveyor.

Fig. 1 illustrates the truck conveyor section 180 as having side deflector flanges 188 for guiding the material onto the main conveyor 186.

Referring to Figs. 5 and 14, blocks 192 are welded to the truck conveyor section 180 and the main conveyor 186 through which the bolts 184 pass for fixedly securing the two conveyors to each other.

From the foregoing description of the various parts of the device, the operation thereof will be readily understood. The bed 10 and the wheels 12 and 14, together with the housings 110, constitute a carriage upon which the conveyor 72 is mounted. The carriage, as well as the conveyor system, is reciprocated in the direction of the arrows 198 of Fig. 5. Should it be necessary to advance the conveyor section 72, the lever 60 is pivoted to the dotted line position of Fig. 5, at which time the clutch parts 34 splined on the shaft 22 are moved into engagement with the clutch dogs 32 on the wheels 12 as the carriage is moving forwardly. The wheels 12 will then turn the shaft 22 and rotate the gears 68 which mesh with the racks 70. Thus the conveyor section 72 will be advanced. Latch fingers 140 yield against the tension of the springs 150 during relative advancement of the conveyor section 72 and the fingers will be urged into holding engagement with the toothed rails 142 to support the conveyor section in its advanced position.

Protection is afforded for the shovel 74 by reason of the cushioning springs 132 in the housings 110. Conveyor section 72 may be shifted rearwardly of the carriage through manipulation of the lever 162 for lifting the latch fingers 140 clear of the toothed rails 142. Because of the length of the toothed rails 142, the conveyor section 72 may be advanced so as to enormously increase the reach of the shovel 74 with respect to a given position of the carriage.

To the channel member 30 are welded two blocks 200 which are bored to slidably receive bolts 202 secured to a bumper 204 located slightly in advance of the channel. Compression springs 206 are interposed between the bumper 204 and the channel 30 to yieldingly hold the bumper in its normal position. The bumper is located relatively close to the ground surface 208, see Fig. 5, to clear a path for the wheels 12.

Lateral shifting may be imparted to the carriage through manipulation of the lever 106 which controls the wheels 14. Thus the carriage may be pivoted about the axis 176 to secure an enormous range of adjustment for the nose 74 to either side, as well as forwardly.

Without further elaboration, the foregoing will so fully illustrate my invention that others may, by applying current knowledge, readily adapt the same for use under various conditions of service.

I claim:

1. In a device of the type described: a reciprocatory carriage having supporting wheels; a normally idle gear on said carriage; a conveyor section mounted on said carriage and having a rack meshing with said gear, said conveyor section reciprocating with said carriage; a toothed member on said conveyor section; a latch means on said carriage acting on said toothed member to restrain the conveyor section from movement relatively to the carriage in one direction, but yielding when said conveyor section is moved to an extended position in the opposite direction relatively to said carriage; and clutch means for operatively connecting said gear with one of said supporting wheels to rotate said gear with said one wheel for advancing the conveyor section to said extended position.

2. In a device of the type described: a reciprocatory carriage having supporting wheels; a normally idle gear on said carriage; a conveyor section mounted on said carriage and having a rack meshing with said gear, said conveyor section reciprocating with said carriage; a toothed member on said conveyor section; a latch means on said carriage acting on said toothed member to restrain the conveyor section from movement relatively to the carriage in one direction, but yielding when said conveyor section is moved to an extended position in the opposite direction relatively to said carriage; clutch means for operatively connecting said gear with one of said supporting wheels to rotate said gear with said one wheel for advancing the conveyor section to said extended position; and a resilient cushion for said latch means yielding upon the application of predetermined forces on said conveyor section in said one direction.

3. The invention described in claim 1 wherein there is provided a second conveyor section secured to said carriage for connection with a main conveyor section; and steering wheels for said carriage.

4. The invention described in claim 1 wherein said carriage is provided with steering wheels; and means for operating said steering wheels.

5. The invention described in claim 1 wherein there is provided resilient means for holding said latch means in yieldable engagement with said toothed member; and means for operating said resilient means to move the latch means clear of said toothed member.

6. A loading head comprising: a reciprocatory carriage having supporting wheels; a normally idle, rotatable axle for said wheels and mounted on said carriage; gears keyed to said axle; a conveyor section mounted on said carriage and having racks meshing with said gears, said conveyor section reciprocating with said carriage; toothed members on said conveyor section along its side margins; latch means on said carriage acting on said toothed members to restrain the conveyor section from movement relatively to the carriage in one direction, but yielding when said conveyor section is moved to an extended position in the opposite direction relatively to said carriage; and clutch means for operatively keying said axle to said supporting wheels to rotate said gears with the supporting wheels for advancing the conveyor section to said extended position.

7. The invention described in claim 6 wherein said carriage is provided with steerable supporting wheels; and means for controlling said steerable supporting wheels.

8. The invention described in claim 6 wherein there is provided a second conveyor section pivotally connected with said carriage and adapted for fixed connection with a main conveyor section; said first conveyor section overlying said second conveyor section; and means for steering said carriage for guiding the latter laterally of the main conveyor section.

9. The invention described in claim 6 wherein said latch means are provided with resilient cushions yielding upon application of predetermined forces effective on the conveyor section in said one direction.

10. The invention described in claim 6 wherein said latch means are provided with resilient cushions yielding upon application of predetermined forces effective on the conveyor section in said one direction; and resilient means acting on said latch means to yieldingly urge the latter into engagement with said toothed members.

11. The invention described in claim 6 wherein there is provided a lever controlled cushioning means for said latch means to yieldingly hold the latter in engagement with said toothed members.

12. The invention described in claim 1 wherein there is provided a manually actuated lever means for operating said clutch means.

13. The invention described in claim 6 wherein said carriage is provided with housings; rods fixedly secured to said latch means and slidably and pivotally supported in said housings; resilient means acting on the rods and said housings for cushioning said conveyor section and yielding upon the application of predetermined forces effective on the conveyor section in said one direction; and controllable resilient means acting on said latch means for holding the latter in yieldable engagement with said toothed members.

GEORGE J. YURCHISIN.